United States Patent
Vaney et al.

(10) Patent No.: US 9,061,661 B2
(45) Date of Patent: Jun. 23, 2015

(54) METHOD OF MANAGING THE BRAKING OF AN AIRCRAFT

(71) Applicant: MESSIER-BUGATTI-DOWTY, Velizy-Villacoublay (FR)

(72) Inventors: Jean-Baptiste Vaney, Velizy-Villacoublay (FR); David Frank, Velizy-Villacoublay (FR); David Lemay, Velizy-Villacoublay (FR)

(73) Assignee: MESSIER-BUGATTI-DOWTY, Velizy Villacoublay (FR)

(*) Notice: Subject to any disclaimer, the term of this patent is extended or adjusted under 35 U.S.C. 154(b) by 0 days.

(21) Appl. No.: 14/135,924

(22) Filed: Dec. 20, 2013

(65) Prior Publication Data

US 2014/0180506 A1    Jun. 26, 2014

(30) Foreign Application Priority Data

Dec. 21, 2012  (FR) ...................... 12 62715

(51) Int. Cl.
*B60T 8/00* (2006.01)
*B60T 8/17* (2006.01)
(Continued)

(52) U.S. Cl.
CPC ................. *B60T 8/1703* (2013.01); *B60T 8/26* (2013.01); *B60T 7/042* (2013.01); *B60T 17/221* (2013.01); *B64C 25/445* (2013.01); *B60T 8/00* (2013.01)

(58) Field of Classification Search
CPC ......... B60T 8/00; B60T 8/1703; B60T 8/325; B60T 8/3255; B60T 8/3275; B60T 7/00; B60T 7/04; B60T 7/06; B64C 25/426; B64C 25/32; B64C 25/34; B64C 2025/325; B64D 45/0005

USPC .............. 701/3, 14, 1; 244/34 R, 202, 100 R, 244/103 R, 102, 110 R, 111, 110 A; 340/945; 303/125–126

See application file for complete search history.

(56) References Cited

U.S. PATENT DOCUMENTS 4,917,334 A * 4/1990 Ralph et al. ............... 244/102 R
5,217,282 A * 6/1993 Guichard .................... 303/9.73
(Continued)

FOREIGN PATENT DOCUMENTS

EP    0 329 373 A1   8/1989
EP    0 498 714 A1   8/1992
(Continued)

OTHER PUBLICATIONS

French Search Report for FR 12 62712, dated Sep. 2, 2013.

*Primary Examiner* — Yonel Beaulieu
(74) *Attorney, Agent, or Firm* — Sughrue Mion, PLLC

(57) ABSTRACT

A method of managing the braking of an aircraft, the aircraft having a plurality of wheels R1, ..., R12, each fitted with a brake F1, ..., F12 adapted to generate a braking force in response to brake pedals 5 being depressed. The management method comprising the steps of (1) distributing the wheels fitted with respective brakes in at least two distinct groups G1, G2, G3, G'1, G'2, G'3; (2) allocating respective braking relationships to each of the groups of wheels for determining how braking force varies as a function of the depression of the brake pedals; and (3) acting at predetermined intervals to permutate the allocation of the relationships to the groups in application of a predefined permutation relationship. The method also includes a step of modifying the permutation relationship in response to the occurrence of a predetermined event.

10 Claims, 1 Drawing Sheet

(51) Int. Cl.
  *B60T 8/26* (2006.01)
  *B60T 7/04* (2006.01)
  *B60T 17/22* (2006.01)
  *B64C 25/44* (2006.01)

(56) References Cited

U.S. PATENT DOCUMENTS

| | | | |
|---|---|---|---|
| 5,397,173 A * | 3/1995 | Bourguet | 303/2 |
| 5,417,477 A | 5/1995 | Lasbleis | |
| 5,806,794 A * | 9/1998 | Hrusch et al. | 244/111 |
| 6,478,252 B1 * | 11/2002 | Stimson et al. | 244/111 |
| 2005/0040286 A1 | 2/2005 | Radford | |
| 2005/0231030 A1 * | 10/2005 | Frank | 303/126 |
| 2008/0150353 A1 * | 6/2008 | Griffith et al. | 303/126 |
| 2008/0154470 A1 | 6/2008 | Goranson et al. | |
| 2009/0276133 A1 | 11/2009 | May et al. | |
| 2011/0226569 A1 | 9/2011 | Devlieg | |
| 2014/0180505 A1 * | 6/2014 | Vaney et al. | 701/3 |

FOREIGN PATENT DOCUMENTS

| | | |
|---|---|---|
| EP | 0 610 115 A1 | 8/1994 |
| EP | 1 588 912 A1 | 10/2005 |
| WO | 94/20344 A1 | 9/1994 |
| WO | 01/15948 A2 | 3/2001 |
| WO | 2010/088396 A1 | 8/2010 |

* cited by examiner

METHOD OF MANAGING THE BRAKING OF AN AIRCRAFT

CROSS-REFERENCE TO RELATED APPLICATION

This application relates to and claims the benefit of priority from French Patent Application number 12 62715, filed on Dec. 21, 2012 the entire disclosure of which is incorporated herein by reference.

The invention relates to a method of managing low-speed braking of an aircraft, in order to improve passenger comfort and to limit brake wear.

BACKGROUND OF THE INVENTION

While an aircraft is taxiing at low speed, i.e. other than during stages of takeoff and landing, its braking needs to be managed in such a manner as to take various constraints into account, including passenger comfort.

In order to improve passenger comfort, it is desirable for braking to be both progressive and accurate. Braking that is progressive makes it possible to avoid the passengers feeling decelerations that are too sudden. At low speed, braking that is accurate is important for comfort, since it serves to avoid the pilot being tempted to act repeatedly on the pedals, e.g. while maneuvering the aircraft in response to instructions from a ramp agent and when confronted with residual engine thrust. The state of the art is illustrated in particular by Document FR 2 701 006, which describes a method of controlling an electro-hydraulic brake device in an aircraft wheel set. While the aircraft is taxiing at low speed, that method consists in separately organizing braking for the wheels of first and second distinct groups of braked wheels, using respective relationships for pressure variation that is controlled as a function of the extent to which brake pedals are depressed, each group of wheels having its own function. A first relationship applies over the entire active range of brake pedal depressions, while a second relationship applies only above a certain predetermined depression threshold for said pedals. Use is then made of a number of brakes that increases as a function of the requested level of braking, thus making it possible to ensure that braking is progressive and accurate, and therefore comfortable.

That method presents a certain number of drawbacks. In the event of a brake being unavailable, e.g. when a piece of equipment involved in controlling the brake has failed, the effectiveness of the braking that results from the remaining brakes is quite clearly diminished. Furthermore, in the event of one or more brakes presenting a temperature or wear that is significantly higher or lower than the other brakes, or indeed wear that is greater, the method does not make it possible to reduce that temperature or wear difference.

OBJECT OF THE INVENTION

An object of the invention is to provide a method similar to that described above, but not presenting the above-mentioned drawbacks.

SUMMARY OF THE INVENTION

In order to achieve this object, the invention provides a method of managing the braking of an aircraft, the aircraft having a plurality of wheels, each fitted with a brake adapted to generate a braking force in response to brake pedals being depressed, the management method comprising the steps of:

distributing the wheels fitted with respective brakes in at least two distinct groups;

allocating respective braking relationships to each of the groups of wheels for determining how braking force varies as a function of the depression of the brake pedals; and acting at predetermined intervals to permutate the allocation of the relationships to the groups in application of a predefined permutation relationship.

According to the invention, the method also includes a step of modifying the permutation relationship in response to the occurrence of a predetermined event.

Thus, when a predetermined event occurs that has an impact on the performance of the aircraft, and in particular on its braking effectiveness, it is possible to modify the permutation relationship in such a manner as to reduce the effects of that predetermined event.

There is also provided a method of managing braking similar to that described above, in which the predetermined event is detecting on at least one wheel:

the unavailability of the brake of the wheel; or a temperature of the brake that is particularly high or particularly low compared with the temperatures of the other brakes; or wear of the brake that is particularly great or particularly small compared with the wear of the other brakes; or a temperature of a tire that is particularly high or particularly low compared with the temperatures of other tires; or a pressure of the tire that is particularly high or particularly low compared with the pressures of other tires.

It is then possible to modify the permutation relationship in such a manner as to reduce the effect of the unavailability of a brake, or to reduce that temperature or wear differences between brakes. Thus, when a certain brake is unavailable or too hot or too worn, a new permutation relationship is used in which a braking relationship that stresses the brakes little is allocated for a certain number of predetermined intervals to the group having the wheel fitted with that brake.

By reducing the extent to which the brake is stressed, either the impact of its unavailability is reduced or else the temperature or wear difference that exists between that brake and the others is reduced.

BRIEF DESCRIPTION OF THE DRAWING

The invention can be better understood in the light of the following description given with reference to the figures of the accompanying drawing, in which.

DETAILED DESCRIPTION OF THE INVENTION

Figure 1:
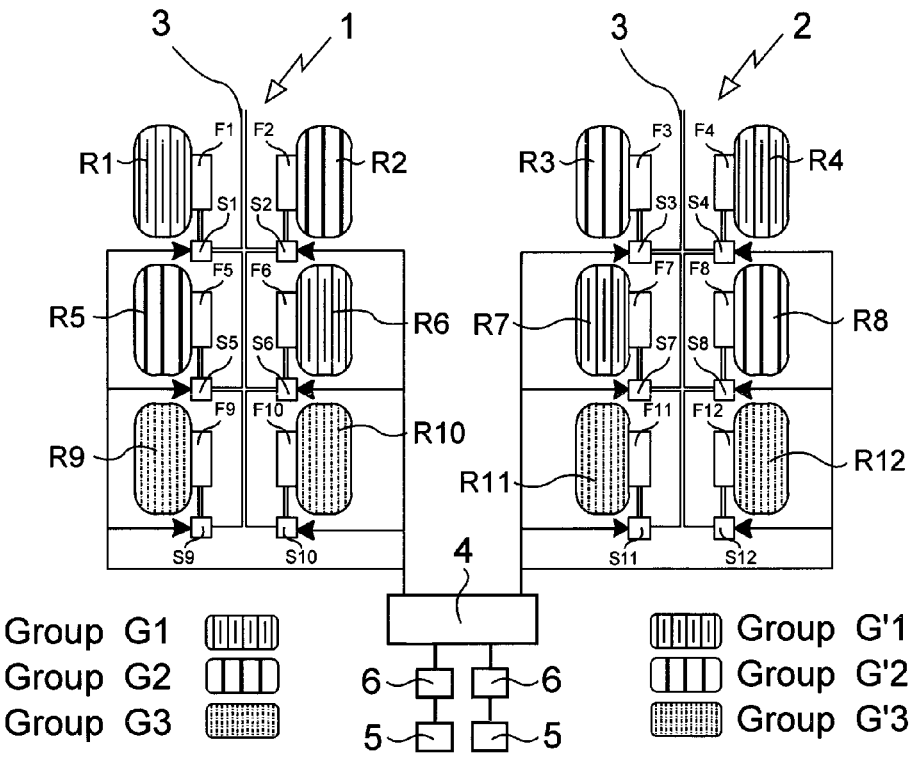
FIG. 1 is a diagrammatic view of the wheels of two main undercarriages of an aircraft in which the method of the invention for managing braking is implemented.

With reference to FIG. 1, the braking management method of the invention in this implementation is used in an aircraft having twelve-wheel landing gear, the wheels being carried by two main undercarriages 1, 2. The wheels of the first main undercarriage 1 are referenced R1, R2, R5, R6, R9, and R10, and the wheels of the second main undercarriage 2 are referenced R3, R4, R7, R8, R11, and R12.

Each wheel R1, ..., R12 is fitted with a respective electrohydraulic brake F1, ..., F12 that is actuated by an associated hydraulic servovalve S1, ..., S12. Each servovalve is fed with fluid by a hydraulic circuit 3 and is electrically controlled by control means 4. The servovalves are controlled as a function of the extent to which brake pedals 5 are depressed (there being two of them in this example). To do this, each brake pedal 5 is associated with a depression sensor 6 that transforms the angle of inclination of the pedal 5, i.e. the extent to which it is depressed, into an electric signal that is representative of its depression. The control means 4, which are electrically connected to the depression sensors 6, are adapted to interpret the electric signals delivered by the depression sensors 6 and to control the servovalves S1, ..., S12 as a function of the angles of inclination of the pedals. Thus, the controlled pressure, and hence the braking force generated by the brakes, are functions of the extent the brake pedals are depressed.

While the aircraft is taxiing at low speed, i.e. at less than a predetermined speed threshold (e.g. 70 km/h or 80 km/h), the control means 4 activate the method of managing the braking of the aircraft that comprises the steps of:

distributing the wheels of the undercarriages 1, 2 into three distinct groups for each undercarriage 1, 2, the groups being given the following references G1, G2, and G3 for the first undercarriage 1, and G'1, G'2, and G'3 for the second undercarriage 2; and allocating respective relationships L1, L2, L3 to each of the groups of wheels for determining how braking force is to vary as a function of the depression of the brake pedals.

Thus, at an initialization moment M0, which corresponds for example to switching on the control means 4 while the brakes of the wheels are in a nominal state, i.e. while the brakes are functional and present relatively similar levels of temperature and wear, the wheels of each undercarriage are distributed among the groups using the following distribution:

the group G1 of the first undercarriage contains the wheels R1, R6, the group G2 contains the wheels R2, R5, and the group G3 contains the wheels R9, R10; and the group G'1 of the second undercarriage contains the wheels R3, R8, the group G'2 contains the wheels R4, R7, and the group G'3 contains the wheels R11, R12.

At the moment M0, the relationship L1 is allocated to the groups G1, G'1, the relationship L2 is allocated to the groups G2, G'2, and the relationship L3 is allocated to the groups G3, G'3.

It should be observed that in order to make braking uniform, it is advantageous to allocate the central wheels R5, R6, and R7, R8 of the undercarriages 1, 2 the different groups. Specifically, the central wheels are often less loaded than the front and rear wheels, and are thus likely to start skidding at lower controlled levels of braking force.

It should also be observed that the groups define a distribution that is symmetrical about a longitudinal midplane of the aircraft and about an axis of each undercarriage (each wheel group produces drag that is symmetrical about said plane and said axis), which is favorable for maintaining good steerability and to reducing twisting forces applied to the undercarriages.

Finally, it should be observed that, although the relationships L1, L2, and L3 are similar, they are applied to the groups G1, G2, G3 and G'1, G'2, G'3 of the two undercarriages 1, 2 in independent manner. In the description below, consideration is given solely to performing the braking management method of the invention on the wheels R1, R2, R5, R6, R9, and R10 of the first undercarriage 1 and to the groups G1, G2, G3 to which they are allocated, with the entire description below being applicable in identical manner to the wheels of the second undercarriage 2 and to the groups G'1, G'2, G'3 to which they are allocated.

Figure 2:
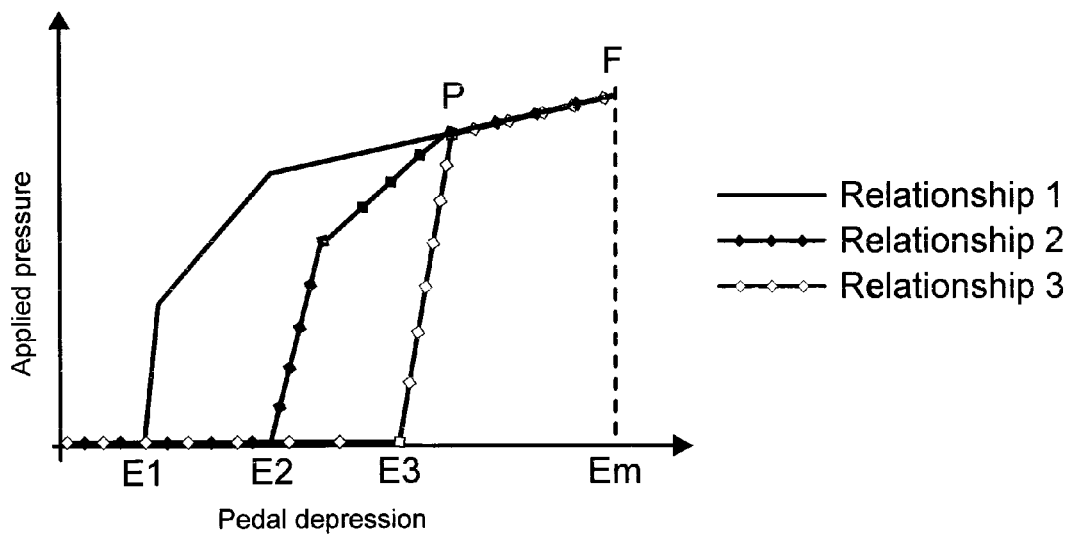
FIG. 2 shows three different pressure-variation relationships for varying the amount of pressure that is applied as a function of the extent to which brake pedals are depressed, the relationships being allocated to groups of wheels among which the wheels of the aircraft are distributed.

The relationships L1, L2, L3, as shown in FIG. 2, are continuously increasing functions F1, F2, F3 that define applied pressures, and thus applied braking forces, starting from distinct minimum thresholds E1, E2, E3 of pedal depression, where E1 is less than E2, that is itself less than E3. A braking force is thus generated from the moment when the brake pedals are depressed to a degree that is greater than or equal to the threshold of the corresponding relationship. The threshold E1 is quite low but not zero, e.g. it may be about 15%. The function F1 remains greater than the function F2, which itself remains greater than the function F3, until all three functions join together at a point P, beyond which all three functions remain equal up to a point F corresponding to maximum depression Em of the pedals.

In order to perform braking at low speed, using an increasing number of brakes as a function of the extent to which the pedals are depressed (four up to E2, then eight up to E3, and thereafter twelve) makes it possible to ensure that braking is progressive and accurate, and thus comfortable. The brakes controlled in application of the relationships L1 and L2, i.e. four out of six brakes, must be capable of generating a braking force equal to the force that would normally be generated by six brakes. Thus, each of these brakes generates a braking force that is relatively large when it is in use.

The management method of the invention also includes the step of acting at predetermined intervals to permutate the allocation of relationships to the groups in compliance with a predetermined permutation relationship.

At the moment M0, the permutation relationship in use consists in automatically alternating the allocation of the laws to the groups each time braking is interrupted, i.e. each time the pedals are released from a depression that is less than a predetermined low value, so that each group of brakes is controlled in succession in application of a different relationship. Thus, a predetermined interval in this example corresponds to a duration between two interruptions of braking. By way of example, the relationships L1, L2, L3 are thus allocated respectively to the groups G3, G1, G2 after a first interruption of braking, they are allocated to the groups G2, G3, G1 after a second interruption of braking, and they are allocated once again to the groups G1, G2, G3 after a third interruption of braking.

The management method of the invention also includes a step of modifying the permutation relationship in response to the occurrence of a predetermined event, in this example detecting on a wheel referred to as a "singular" wheel:

the unavailability of the brake of the singular wheel; or a temperature of the brake of the singular wheel that is particularly high or particularly low compared with the temperatures of the other brakes; or wear of the brake of the singular wheel that is particularly great or particularly small compared with the wear of the other brakes.

In the event of the unavailability of the brake of the singular wheel being detected, the permutation relationship is modified by using a new permutation relationship in which the relationship L3 is allocated permanently to the group having the singular wheel, without that allocation being permutated, and in which the relationships L1 and L2 are allocated to the other two groups, with this allocation being permutated on each occasion that braking is interrupted. Since the relationship L3 presents the greatest minimum threshold E3 for pedal depression above which a braking force is supposed to be generated, the relationship L3 is the relationship that stresses the brakes the least: the impact of the unavailability of the brake of the singular wheel on the effectiveness of braking is thus minimized.

For example, when it is detected that the brake F10 of the wheel R10 is unavailable, the relationship L3 is allocated to the group G3 in permanent manner (until the brake F10 is once more available), and the allocation of the relationships L1 and L2 to the groups G1 and G2 continues to be permutated on each occasion that braking is interrupted.

In the event of the temperature of the brake of the singular wheel being particularly high relative to the temperatures of the other brakes (e.g. when the temperature of the brake of the singular wheel becomes higher than 500° C., while the temperatures of the brakes of the other wheels remain within nominal temperature ranges), then the permutation relationship is modified by using a new permutation relationship in which the relationship L3 is allocated for a certain number of predetermined intervals to the group that has the singular wheel. During that duration, the allocation of the relationships L1 and L2 continues to be permutated between the other two groups. Since the relationship L3 is the relationship that stresses the brakes the least, the temperature of the brake of the singular wheel will increase less during braking than will the temperatures of the brakes of the wheels in the other groups, and will therefore come closer to the temperatures of the other brakes. The same a modification to the permutation relationship is made in the event of the wear of a brake being particularly great compared with the wear of the other brakes.

Conversely, when the temperature of the brake of the singular wheel is particularly low compared with the temperatures of the other brakes, i.e. when the temperature of the brake of the singular wheel is less than that of the other wheels and the difference is greater than a predetermined threshold (e.g. 40° C.), then the permutation relationship is modified to implement a new permutation relationship in which the relationship L1 is allocated for a certain number of predetermined intervals to the group including the singular wheel. During that duration, the allocation of the relationships L2 and L3 continues to be permutated between the other two groups. Since the relationship L1 is the relationship that stresses the brakes the most, the temperature of the brake of the singular wheel will increase more during braking than will the temperatures of the brakes of the wheels in the other groups, and will therefore come closer to the temperatures of the other brakes. The same a modification to the permutation relationship is made in the event of the wear of a brake being particularly small compared with the wear of the other brakes.

For example, when it is detected that the brake F10 of the wheel R10 has a temperature that is more than 40° C. below the temperatures of the other brakes, the relationship L1 is allocated to the group G3 during a certain number of intervals (until the temperature difference between the brake F10 and the other brakes returns to within a predetermined threshold), and the allocation of the relationships L2 and L3 to the groups G1 and G2 continues to be permutated on each occasion that braking is interrupted throughout the duration that corresponds to the certain number of predetermined intervals. After this certain number of predetermined intervals, the system returns to the permutation relationship as defined at M0.

The same a modification to the permutation relationship is made in the event of the wear of a brake being particularly small compared with the wear of the other brakes.

The invention is not limited to the particular embodiment described above, but on the contrary it covers any variant coming within the ambit of the invention as defined by the claims.

Although the invention is described with reference to wheels having electro-hydraulic brakes, it is naturally possible to apply the invention to brakes that are electromechanical. The relationships L1, L2, and L3 that are used will naturally be adapted, but they continue to define variations in braking force that increase continuously in response to depressing brake pedals, and different minimum thresholds for brake pedal depression from which a braking force begins to be applied.

Although the landing gear described has twelve wheels mounted on two main undercarriages and distributed in three groups, the braking management method of the invention may be performed on an aircraft having some other number of wheels that are distributed in some other number of groups.

Although a certain initial distribution is proposed for organizing the wheels in groups, this initial distribution could naturally be different. For the first undercarriage, a first group could be made up of the wheels R1, R5, and R9, and a second group could be made up of the wheels R2, R6, and R10. It is also possible to form groups with different undercarriage wheels. A first group could be made up of the wheels R1, R2, R7, and R8, and a second group could be made up of the wheels R3, R4, R5, and R6.

The relationships L1, L2, L3 are provided purely by way of illustration, and they could naturally be defined in other ways (in particular document FR 2 701 006 describes other relationships).

Provision may be made to modify the permutation relationship in response to the occurrence of other events, for example detecting that the pressure of a tire of a wheel is particularly high or particularly low, or detecting that a temperature of the tire is particularly high or particularly low, compared with the pressures or temperatures of the other wheels.

Although it is stated that a predetermined interval corresponds to a duration between two interruptions of braking, a predetermined interval may perfectly well correspond to a fixed duration (a few seconds, twenty-four hours, etc.), or indeed to a duration between two different events (duration between two stages of braking, etc.).

The invention claimed is:
1. A method of managing the braking of an aircraft, the aircraft having a plurality of wheels (R1, . . . , R12), each fitted with a brake (F1, . . . , F12) adapted to generate a braking force in response to brake pedals (5) being depressed, the management method comprising the steps of:
 distributing the wheels fitted with respective brakes in at least two distinct groups (G1, G2, G3, G'1, G'2, G'3);
 allocating respective braking relationships (L1, L2, L3) to each of the groups of wheels for determining how braking force varies as a function of the depression of the brake pedals; and
 acting at predetermined intervals to permutate the allocation of the relationships to the groups in application of a predefined permutation relationship;
 the method being characterized in that it further comprises the step of modifying the permutation relationship in response to the occurrence of a predetermined event.
2. A braking management method according to claim 1, wherein the predetermined event is detecting on at least one wheel (R1, . . . , R12):
 the unavailability of the brake (F1, . . . , F12) of the wheel; or
 a temperature of the brake that is particularly high or particularly low compared with the temperatures of the other brakes; or wear of the brake that is particularly great or particularly small compared with the wear of the other brakes; or a temperature of a tire that is particularly high or particularly low compared with the temperatures of other tires; or a pressure of the tire that is particularly high or particularly low compared with the pressures of other tires.

3. A braking management method according to claim 2, wherein each braking relationship (L1, L2, L3) defines a respective minimum threshold (E1, E2, E3) for depression of the brake pedals (5) from which a braking force is generated, and wherein the modification to the permutation relationship consists in using a new permutation relationship in which the braking relationship (L3) that defines the highest minimum depression threshold is allocated to a group in which one of the wheels has its brake unavailable, and in which the allocation for this group is no longer permutated.

4. A braking management method according to claim 2, wherein each braking relationship (L1, L2, L3) defines a respective minimum threshold (E1, E2, E3) for depression of the brake pedals (5) from which a braking force is generated, and wherein the modification to the permutation relationship consists in using a new permutation relationship in which the braking relationship (L3) that defines the highest minimum depression threshold is allocated for a plurality of predetermined intervals to a group including a wheel on which there has been detected:

a temperature of the brake that is particularly high compared with the temperatures of the other brakes; or wear of the brake that is particularly great compared with the wear of the other brakes; or a temperature of a tire that is particularly high compared with the temperatures of other tires; or a pressure of the tire that is particularly high compared with the pressures of other tires.

5. A braking management method according to claim 2, wherein each braking relationship (L1, L2, L3) defines a respective minimum threshold (E1, E2, E3) for depression of the brake pedals (5) from which a braking force is generated, and wherein the modification to the permutation relationship consists in using a new permutation relationship in which the braking relationship (L1) that defines the lowest minimum depression threshold is allocated for a plurality of predetermined intervals to a group including a wheel on which there has been detected:

a temperature of the brake that is particularly low compared with the temperatures of the other brakes; or wear of the brake that is particularly small compared with the wear of the other brakes; or a temperature of a tire that is particularly low compared with the temperatures of other tires; or a pressure of the tire that is particularly low compared with the pressures of other tires.

6. A braking management method according to claim 1, wherein a predetermined interval is a duration between two occasions on which brake pedals (5) are released.

7. A braking management method according to claim 2, wherein a predetermined interval is a duration between two occasions on which brake pedals (5) are released.

8. A braking management method according to claim 3, wherein a predetermined interval is a duration between two occasions on which brake pedals (5) are released.

9. A braking management method according to claim 4, wherein a predetermined interval is a duration between two occasions on which brake pedals (5) are released.

10. A braking management method according to claim 5, wherein a predetermined interval is a duration between two occasions on which brake pedals (5) are released.

* * * * *